US011017437B2

(12) United States Patent
Innes et al.

(10) Patent No.: US 11,017,437 B2
(45) Date of Patent: May 25, 2021

(54) METHOD AND SYSTEM FOR MANAGING COMMUNICATIONS INCLUDING ADVERTISING CONTENT

(71) Applicant: AT&T INTELLECTUAL PROPERTY I, LP, Atlanta, GA (US)

(72) Inventors: Timothy Innes, Atlanta, GA (US); Nigel Bradley, McDonough, GA (US); Wasib Khallil, Atlanta, GA (US); Alexander MacDougall, Newnan, GA (US); Bhumit Patel, Atlanta, GA (US); David Spivey, Smyrna, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 733 days.

(21) Appl. No.: 15/164,385

(22) Filed: May 25, 2016

(65) Prior Publication Data
US 2017/0345058 A1 Nov. 30, 2017

(51) Int. Cl.
*G06Q 30/02* (2012.01)
*G06Q 10/02* (2012.01)
*G06Q 10/10* (2012.01)

(52) U.S. Cl.
CPC ......... *G06Q 30/0269* (2013.01); *G06Q 10/02* (2013.01); *G06Q 10/1095* (2013.01); *G06Q 30/0257* (2013.01); *G06Q 30/0261* (2013.01); *G06Q 30/0267* (2013.01); *G06Q 30/0276* (2013.01); *G06Q 30/0277* (2013.01)

(58) Field of Classification Search
CPC ........... G06Q 30/0241; G06Q 30/0251; G06Q 30/0255; G06Q 30/0269; G06Q 30/0271; G06Q 30/0277; G06Q 30/0261; G06Q 30/0267; G06Q 10/1095; G06Q 30/0257; G06Q 30/0276
See application file for complete search history.

(56) References Cited

U.S. PATENT DOCUMENTS

| | | | | |
|---|---|---|---|---|
| 5,293,357 A | * | 3/1994 | Hallenbeck | H04N 5/782 360/69 |
| 5,670,955 A | * | 9/1997 | Thorne, III | G06F 3/0338 178/18.03 |
| 8,606,637 B1 | | 12/2013 | Delker et al. | |

(Continued)

*Primary Examiner* — Kiersten V Summers
(74) *Attorney, Agent, or Firm* — Guntin & Gust, PLC; John G. Rauch

(57) ABSTRACT

Aspects of the subject disclosure may include, for example, a method that include combining an offer with media content to generate a notice within a portion of the media content, providing the notice in the designated portions of the media content with the notice during a media content presentation at equipment of a user, receiving an indication of interest in the portion, retrieving marketing information for the portion of the media content based on the user profile including location based information, time based information, and activity information, monitoring an activity of the mobile communication device to determine when the mobile communication device information satisfies a location, time, and activity information that matches the marketing information and determining a communication for the user based on the marketing information and the monitoring of the activity of the mobile communication device. Other embodiments are disclosed.

20 Claims, 8 Drawing Sheets

(56) References Cited

U.S. PATENT DOCUMENTS

| | | | | |
|---|---|---|---|---|
| 2002/0013785 A1* | 1/2002 | Miyazaki | G06Q 30/0253 | 705/14.51 |
| 2002/0035480 A1* | 3/2002 | Gordon | G06Q 30/02 | 705/309 |
| 2002/0166127 A1 | 11/2002 | Hamano et al. | | |
| 2002/0186261 A1* | 12/2002 | Giles | G06F 3/0481 | 715/853 |
| 2003/0063117 A1* | 4/2003 | Chang | H04N 5/44543 | 715/721 |
| 2003/0095139 A1* | 5/2003 | Davidsson | G06F 17/3071 | 715/700 |
| 2004/0080767 A1* | 4/2004 | Meilstrup | G06F 3/1205 | 358/1.13 |
| 2005/0039136 A1* | 2/2005 | Othmer | G06Q 30/02 | 715/774 |
| 2005/0159252 A1* | 7/2005 | Fergestad | A63B 24/0021 | 473/471 |
| 2005/0177861 A1* | 8/2005 | Ma | H04N 5/4403 | 725/135 |
| 2005/0255874 A1* | 11/2005 | Stewart-Baxter | H04M 1/6075 | 455/550.1 |
| 2006/0048207 A1* | 3/2006 | Martin | H04M 1/271 | 725/135 |
| 2006/0168631 A1* | 7/2006 | Nishikawa | H04N 5/44513 | 725/89 |
| 2007/0027760 A1* | 2/2007 | Collins | G06Q 30/02 | 705/14.54 |
| 2007/0174259 A1* | 7/2007 | Amjadi | G06F 17/30864 | |
| 2008/0195468 A1* | 8/2008 | Malik | G06Q 30/02 | 705/14.53 |
| 2008/0235681 A1* | 9/2008 | Barnett | G06Q 10/109 | 717/178 |
| 2008/0294999 A1* | 11/2008 | Bank | G06Q 10/00 | 715/751 |
| 2009/0024482 A1* | 1/2009 | Synstelien | G06Q 30/02 | 705/14.4 |
| 2009/0285545 A1* | 11/2009 | Bon | H04N 7/163 | 386/239 |
| 2009/0313318 A1* | 12/2009 | Dye | G06Q 30/00 | 709/202 |
| 2010/0332496 A1* | 12/2010 | Horvitz | G06Q 30/02 | 707/759 |
| 2011/0022470 A1 | 1/2011 | Varadarajan et al. | | |
| 2011/0151897 A1* | 6/2011 | Macwan | H04L 12/1859 | 455/466 |
| 2011/0313856 A1 | 12/2011 | Cohen et al. | | |
| 2011/0321084 A1* | 12/2011 | Takahashi | H04N 5/23293 | 725/32 |
| 2012/0084812 A1* | 4/2012 | Thompson | H04N 21/25891 | 725/34 |
| 2012/0179542 A1 | 7/2012 | Findlan et al. | | |
| 2012/0226779 A1* | 9/2012 | Crucs | G06Q 10/1093 | 709/219 |
| 2013/0227607 A1* | 8/2013 | Saltonstall | H04N 21/458 | 725/35 |
| 2014/0032323 A1 | 1/2014 | Joshi et al. | | |
| 2014/0122227 A1 | 5/2014 | Reinshagen et al. | | |
| 2014/0137188 A1 | 5/2014 | Bartholomay et al. | | |
| 2014/0195345 A1 | 7/2014 | Lyren et al. | | |
| 2014/0215507 A1* | 7/2014 | Wouhaybi | G06Q 30/02 | 725/14 |
| 2015/0154647 A1* | 6/2015 | Suwald | G06Q 30/0269 | 705/14.66 |
| 2016/0021507 A1* | 1/2016 | Gaines | H04W 4/023 | 455/456.2 |
| 2016/0071163 A1 | 3/2016 | Chand | | |

* cited by examiner

400

700

METHOD AND SYSTEM FOR MANAGING COMMUNICATIONS INCLUDING ADVERTISING CONTENT

FIELD OF THE DISCLOSURE

The subject disclosure relates to managing communications including advertising content.

BACKGROUND

Television broadcast companies rely on advertising to pay for media content. Typically, advertising has been passively provided to viewers without the ability for the viewers to learn more about the subject of the advertising.

BRIEF DESCRIPTION OF THE DRAWINGS

Reference will now be made to the accompanying drawings, which are not necessarily drawn to scale, and wherein.

DETAILED DESCRIPTION

Figure 1:
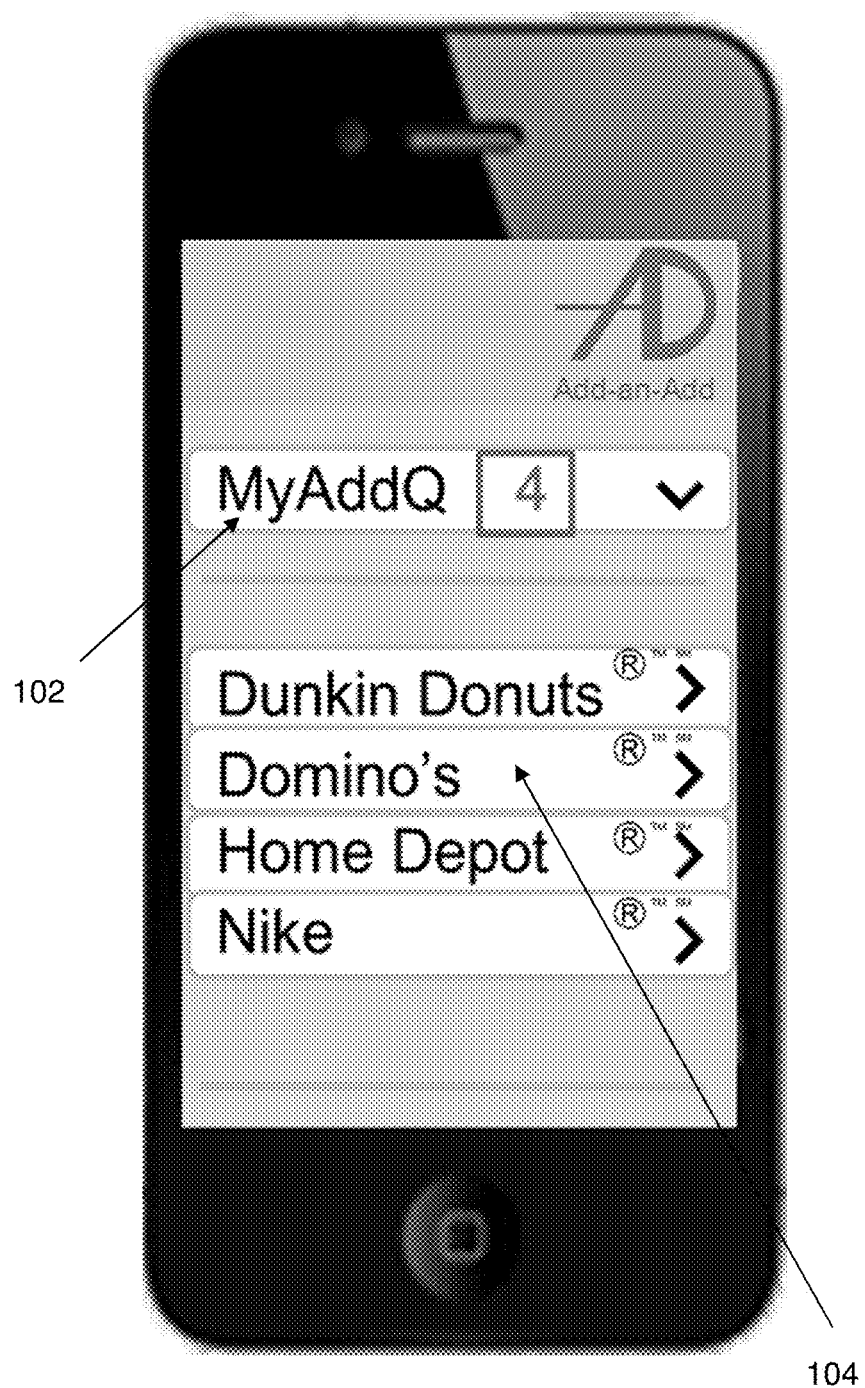
FIG. 1 depicts an illustrative embodiment of system 100.

The subject disclosure describes, among other things, illustrative embodiments for requesting more information about advertising content. Other embodiments are described in the subject disclosure.

One or more aspects of the subject disclosure include a method including combining, by a processing system including a processor, an offer with a media content presentation to generate a notice within a portion of the media content presentation as designated portions of the media content with the notice, providing, by the processing system, the notice in the designated portions of the media content with the notice during a media content presentation at equipment of a user, receiving, by the processing system, an indication of interest in the portion of the media content from the equipment of the user during a presentation of the notice during the media content presentation at the equipment of the user, receiving, by the processing system, user information related to the portion of the media content responsive to receiving the indication of interest in the notice of the portion of the media content, accessing, by the processing system, a user profile for the user based on the user information, retrieving, by the processing system, marketing information for the portion of the media content based on the user profile, wherein the marketing information includes location based information for the portion of the media content, time based information for the portion of the media content, and activity information for the portion of the media content, determining, by the processing system, mobile communication device information of the user based on the user profile, wherein the mobile communication device information includes location information, time information, and activity information, monitoring, by the processing system, an activity of the mobile communication device to determine when the mobile communication device information satisfies a location, time, and activity information that matches the marketing information, determining, by the processing system, a communication for the user based on the marketing information and the monitoring of the activity of the mobile communication device, and providing, by the processing system, the communication for the user to the mobile communication device regarding the portion of the media content responsive to the monitoring determining that mobile communication device satisfies the marketing information.

One or more aspects of the subject disclosure include a media processor including a processing system including a processor and a memory that stores executable instructions that, when executed by the processing system, facilitate performance of operations that include receiving a stream of media content from an interactive television network, receiving offer details from an advertising server, wherein the offer details comprises a key, an offer, and marketing information, combining the offer with the stream of media content based on the key to generate a notification within a selected portion of the stream of media content as designated portions of the media content with the notification, presenting the stream of media content including the notification included within the designated portions of the media content, receiving a signal from equipment of a user that indicates an interest in one portion of the designated portions of the media content. Responsive to receiving the signal from the equipment of the user in the one portion of the media content, the operations include providing a notification that the signal was received in relation to the one portion of the media content to the advertising server associated, wherein the advertising server accesses account information of the user from the interactive television network, and that the advertising server retrieves marketing information for the one portion of the media content based on the account information of the user, wherein the marketing information includes location based information for the one portion of the media content, time based information for the one portion of the media content, and activity information for the one portion of the media content, and that the advertising server monitors mobile communication devices of the user regarding the one portion of the media content responsive to a determination that a location, a time, and an activity of the mobile communication devices satisfies the marketing information, that the advertising server determines a communication for the user based on the marketing information and the monitoring of the mobile communication devices to determine an optimal communication with the user, and that the advertising server delivers the communication to the mobile communication devices.

One or more aspects of the subject disclosure include a machine-readable storage medium, including executable instructions that, when executed by a processing system including a processor, facilitate performance of operations that include receiving marketing information from an advertising server, wherein advertising server has accessed user information of a user responsive to receiving an indication of interest in a notification that was presented during a portion of media content presented to the user within a presentation of the media content at a media processor of the user, and wherein the advertising server obtained the marketing information for the user based on the indication of interest in the notification, monitoring activities of the user, such as accessing social media accounts, scheduling applications, messaging applications, and then providing the activities of the user to the advertising server, determining a location of interest for the user based on the marketing information, monitoring a location of the user to determine if the user is in proximity to the location of interest, and responsive to determining if the user is in proximity to the location of interest, the operations would include sending a message to the advertising server, the message including the location of the user, receiving, from the advertising server, directed marketing information for the location of the interest for the user, wherein the advertising server determines an optimal communication to the user based on the marketing information and the monitoring of the activity of the user, and presenting the directed marketing information to the user.

FIG. 1 depicts an illustrative embodiment of system 100. System 100 can include an advertising application 102 that can present a user with various offers and other promotional materials 104. Exemplarily, the user would have the advertising application 102 loaded on a mobile communication device or other computing device. As discussed below, the advertising application 102 can monitor the user's activities and location to determine when best to provide the user with a directed advertisement or a notice regarding goods or services that the user has previously expressed interest in. Exemplarily, the advertising application 102 can be accessed in a mobile device 106 or any other computing device.

The promotional materials 104 can include coupons for the particular retailer or service provider associated with the advertising application 102. In addition, the promotional materials can contain maps to relevant retailer locations, settings for the retailer or service provider, feedback to or from the retailer or service provider, information from the retailer or service provider, social media connections with other users of the retailer or service provider.

Figure 2:
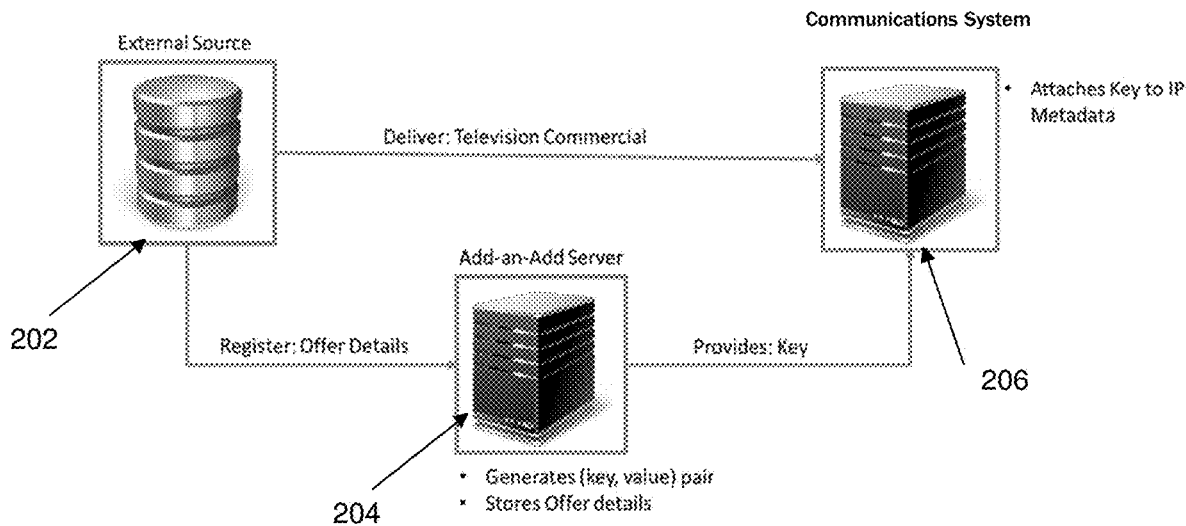
FIG. 2 depicts an illustrative embodiment of system 200.

FIG. 2 depicts an illustrative embodiment of system 200. System 200 exemplarily provides an external source 202 which provides content to servers 204 and 206. Exemplarily server 202 provides an interactive television system with media content including entertainment and advertising. Exemplarily, server 204 is an ad server, or an Add-an-Add server, that can store various offers from various advertiser accounts. Ad server 204 can also store various keys that would identify the offers with the media content it is to be combined with. The offer would include data and information regarding the advertisement. Exemplarily, the media content would be combined with the offer through the key to provide an advertisement to be presented at user equipment. The user equipment would include, for example, a media processor. The offer would exemplarily be presented in a notification, such as in an overlay on the screed. The overlay would include an indication that there is additional content or information available.

Exemplarily, the equipment of the user would receive an indicator of interest in response to the indication in the advertising. Next, the key of the advertising would be used to identify which user or media processor device has selected the advertisement. For example, if the media processor presents an advertisement that has been provided with an offer attached, an overlay can be created from the information included in the offer. Exemplarily, the information included with the offer would include graphics to be included in the overlay as well as sounds or other presentation options.

Additionally, server 206 can be a server from an interactive television system, or a communication system, which provides a combined output of advertising or other content with the offers and the key for the offers. Thus, server 206 can include content servers for an interactive television network. Server 206 would exemplarily provide the media content including the offer to a media processor of a user.

Figure 3:
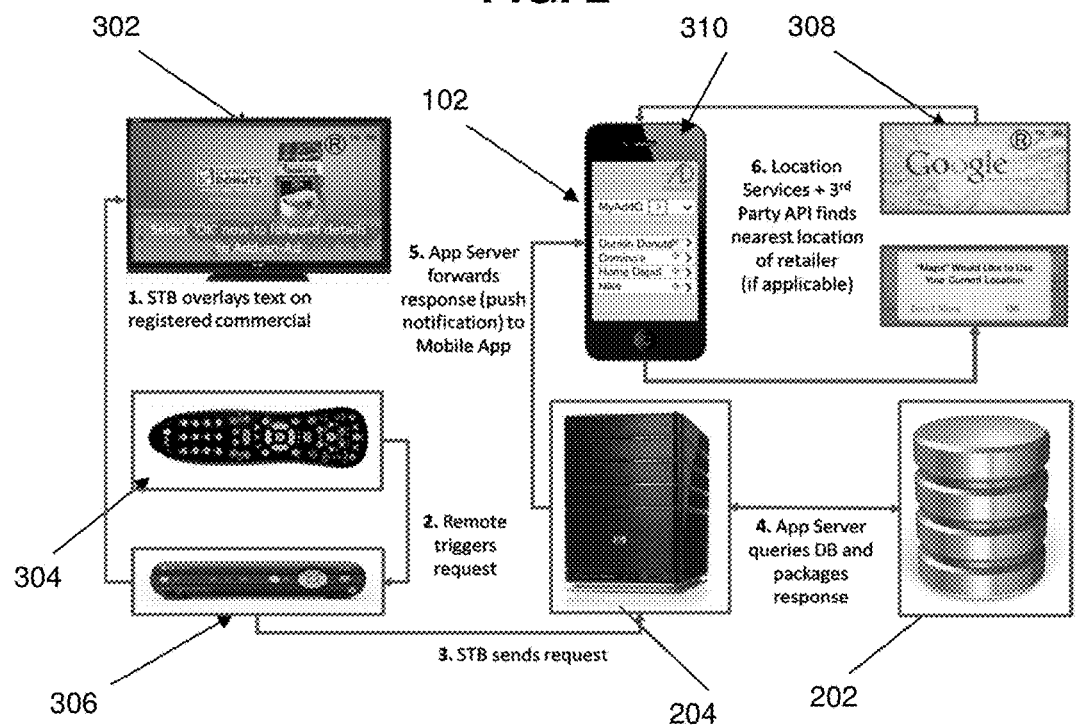
FIG. 3 depicts an illustrative embodiment of system 300.

FIG. 3 depicts an illustrative embodiment of system 300. System 300 illustrates an embodiment in which the advertisement is presented to viewers. Exemplarily, the server 206 of FIG. 2 would present media content to a set-top box or other media device 306 on a display device 302. As exemplarily illustrated in FIG. 3, an advertisement includes a prompt. The prompt would direct a viewer to engage a remote control device 304 associated with the display device 302.

Exemplarily, an advertisement is presented on the display device 302 associated with the media device 306. The advertisement includes a notification. The notification can be presented in an overlay on the screen over the advertisement. In particular, the user would be prompted with an indication that more information is available regarding the product or service being advertised. Exemplarily, a sound or visual prompt would instruct the user to indicate interest in the advertisement to receive, among other things, additional information, coupons, invitations to special events, maps to locations to purchase or view the goods or service, as well as social networking options. For example, contacts from the user's social networks can also be presented with marketing information related to the advertisement.

Next, the user would use the remote control device 304 to indicate interest in the advertisement. Exemplarily, the media device 306 would register the response from the remote control 304 and provide the response to the ad server 204. Other embodiments can include the user responding to the notification by other means, such as texting a code the advertiser.

Exemplarily, the ad server 204, upon receiving the response from the set-top box 306 would provide a notice to the external source 202 and to the advertising application 102 provided on a mobile communications device 310. The mobile communications device 310 can be any mobile device or computing device on which the advertising application 102 has been installed. The external source 202 can be informed of the user's response and use the information from that response to further learn about the user's preferences. This information can be provided to the advertiser for further discernment of the effectiveness of the advertising, along with demographic information of those who requested more information about the advertisement.

Exemplarily, advertising application 102 can access GPS or other location services 308 of the mobile device on which the advertising application 102 is located. Advertising application 102 can also determine a time of day. In additional embodiments, other devices and social media accounts of the user can be accessed and notified by the advertising application 102 or the ad server 204. Other embodiments can include instructions for application 102 to access calendars and scheduling applications to determine activities that the user is or will be engaged in. In yet other embodiments, the location data, activity data, time data, and social media data can be combined together.

In doing so, exemplary embodiments of the system can determine the user's location in relationship to retail locations associated with the response to thereby provide a reminder, for example, that a location associated with the advertisement is nearby. The system can also use the time data to determine if it is an appropriate time to provide the user with that advertisement. Once the user is determined to be located near the location, the advertising application can provide marketing information to the user, such as coupons. In other embodiments, the system can decide that, based on the time of day, an advertisement would not be appropriate, despite the location data. For example, breakfast coupons would not be appropriate in the evening, even if the user is determined to be near a breakfast provider that the user had expressed interest in.

In some embodiments, the marketing information is preloaded onto the mobile device via the advertising application 102 while in other embodiments, the advertising application 102 can alert the ad server 204 of the proximity to the location to request and receive the marketing information for that location in real time. In other embodiments, the advertising application 102 can determine when is the best time to present information regarding the advertisement. In yet other embodiments, the user's scheduling programs can be accessed to determine when the user will be best suited to be provided with information regarding the advertisement.

Exemplarily, the system can monitor the user's activities to determine an optimal communication for the user. In some embodiments, these activities can include an analysis of past responses to the communications provided to the user. For example, if the user was provided with coupons to the donut store in which the user expressed interest, the particular coupons used or not used could be analyzed to present better coupons. In other embodiments, the activity could include the time in which the communications were responded to or the time at which the offers were used. As discussed above, sometimes, the time is considered when presenting communications. However, if one user is determined to eat donuts in the evening and not at breakfast, then an appropriate change in the time of presenting the coupons would be made.

In other embodiments, the user activity can include analyzing data from the user's scheduling software, the user's daily routine, or other considerations in determining the user's schedule to predict when to best communicate with the user. In some embodiments, an optimal communication can be generated by considering any of the time data, the scheduling data, the past usage of coupons data, survey data, and responses to invitations. In yet other options, the social media accounts of the user can be accessed to determine the optimal communication as well as to exemplarily invite or contact persons known to the user including friends, coworkers, and family members.

Accordingly, in some embodiments, a user would see an overlay over an advertisement on a display device located at his house. The user would then press a button corresponding to an instruction on the overlay on a remote control that controls the display device or the media processor associated with the display device. The user's information would then be processed by the system and the user would be provided with various forms of information regarding that product based on the user's account information and other information, such as the user's activity information discussed above. Accordingly, in one example, the next day while driving past a store containing the item of interest, the user's mobile device will present the user with a notice to that effect.

Exemplarily, the user can be provided with information regarding the advertisement via the advertising application 102 in the mobile device 106. Thus, for example, if the user has expressed interest in a certain coffee shop, the user would be alerted upon entering into a proximity of that coffee shop. In addition, the user can be provided with coupons or surveys via the advertising application 102.

Figure 4:
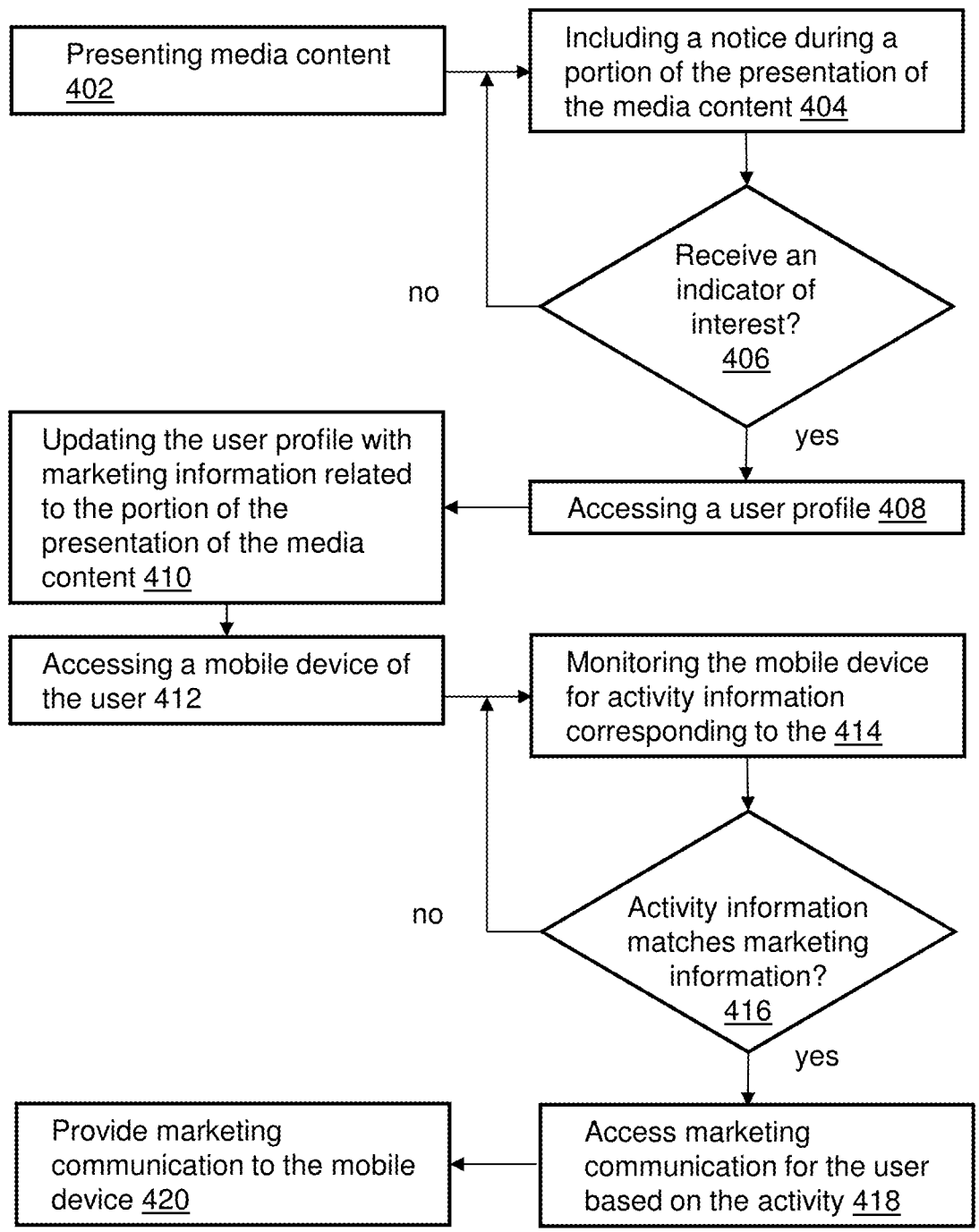
FIG. 4 depicts an illustrative embodiment of a method used in portions of the system described in FIGS. 1-3.

FIG. 4 depicts an illustrative embodiment of a method 400 used by systems 100, 200, and 300. Method 400 exemplarily begins at Step 402 in which media content is presented to a user or a viewer. Exemplarily, the media content is being presented via a set-top box or media processor associated with the viewer. Throughout the presentation of the media content, a notice can be presented to the viewer indicating that more information, including special offers or coupons, are available if an indicator of interest is provided as exemplarily illustrated in step 404. In some embodiments, the notice can include an overlay on the screen directing the user to press a certain button on the remote control associated with the media processor. Exemplarily, the notice is provided during an advertisement presented during the presentation of the media content. In other embodiments, the notice can be presented during non-advertisement portions of the media content. For example, the notice can be provided during scenes in a movie, where the notice would, for example, invite the user to learn more about a certain scene, such as an Easter egg that appeared during the scene. In another example, a notice would be provided in a scene during a television show to allow the user to learn more about a product that a character is using.

In step 406, it is determined whether an indicator of interest has been received during the presentation of the notice in step 404. In some embodiments, the indicator of interest can be received via a signal from the user's remote control after the user presses an appropriate button. In other embodiments, the indicator of interest can be received by the user sending a text message, an email, taking a screen shot or picture of the display that displays the overlay, or by recording the sound of the media content being played. The screen shot, picture, or sounds can then be analyzed by the advertising application, in some embodiments, or a server in other embodiments, to determine if the screen shot, picture, or sounds are recognizable and associated with an advertisement.

If no indicator of interest is received in step 406, the method exemplarily returns to presenting media content until another notice is included in the media content in step 404. If the user does provide an indicator of interest, method 400 would proceed to step 408 in which the user's profile is exemplarily accessed. Exemplarily, the user's profile would be known to the media content provider because the viewer is watching media content provided at a known media processor that provides a subscription service.

The user profile is exemplarily accessed to determine the name, age, location, sex, income, and other relevant marketing information for the user. Additionally, the user profile would include a description or identifier of other communication devices that the user owns and exemplarily has indicated a preference to receiving marketing information. For example, the user profile information may include a mobile communications device number that can receive instant messages and texts. Additionally, the user profile information can include the account information of the application. By having the account information for the advertising application, the user can exemplarily be reached via any computing device or communications device that has installed the advertising application.

Once the user's profile information has been accessed, the user's profile information can be updated in step 410. The user profile can have information related to the indication of interest. Thus, for example, if the user were to express interest in a donut or coffee commercial, the preference of this particular taste can be noted. Once updated, other similar coffee or breakfast items can be selected for presentation to the user.

Once the marketing activities are determined, method 400 can proceed to step 412 in which the mobile device of the user is exemplarily accessed. In other embodiments, the advertising application itself can be accessed in any computing device or communications device to which the user has access. Exemplarily, the mobile device or application is monitored in step 414. Monitoring can exemplarily include observing the location of the user, the time at which the user is currently active, and interacting with various scheduling functions to determine activities that the user is engaged in or will be engaged in. Next, in step 416 it is determined whether the user's monitored actions correlate to the marketing information that is available in the user's profile information.

Once an activity is determined, method 400 may proceed to step 418 in which marketing communications can be accessed for the user. Exemplarily, an optimal communication is determined for the user. In some embodiments, the marketing communications can be a one-size-fits-all coupon. In other embodiments, the activity information of the user is carefully analyzed to present a communication most likely to be used by the user.

In one example, in situations in which the user indicated interest in a donut shop advertiser, the user's communication device can determine if the user is near a location before presenting the user with marketing activities, such as a coupon. In other examples, it may be determined that the user is in his morning routine and therefore it would be an appropriate time to provide a reminder that the advertiser's coffee or donuts should be purchased. In other embodiments, the advertising application may determine the user is engaged in activity that relates to other marketing activities, such as going to a gym or a sporting event. In determining the user is at a gym, for example, marketing information including sports related products could be presented to the user based on their earlier indicators of interest or based on the various updates to the user's profile information that would tend to indicate that such marketing activities are appropriate for the user.

In addition, specific marketing activities related to the advertisement can be exemplarily prepared for the user. For example, these marketing activities can include coupons, determining locations that would be relevant for the user to visit, and requesting feedback from user to indicate what the user does or does not like about the advertised product. In some embodiments, a map can be provided with alternative locations to receive the product in question.

In additional embodiments, the user may be provided with invitations to special sales events, focus groups, and live events sponsored by the advertiser. For example, the marketing information may determine that certain type of consumer will be attracted to in-store events such invite-only (or, for example, an invite only for the first 2 hours of the event) events and, if appropriate, provide those types of invitations to the user. In other instances, the marketing information may determine that certain type of consumer will be attracted the ability to express their thoughts and suggestions about a certain products. This propensity can be leveraged to turn customers into fans by providing them the mechanism to take an active role in the product or service. In other instances, the marketing information may determine that certain type of consumer will be attracted to the ability to purchase a product before anyone else. This exclusivity seeker can be enticed to preorder items that are new or updated.

Once the desired marketing activity is determined, the marketing activity is exemplarily communicated to the user in step 420 as a marketing communication. In some embodiments, the communication is provided to the user's communication device or mobile device. In other embodiments, an alert to the marketing communication can be provided by the advertising application depending on which platform the user is currently logged in at.

Figure 5:
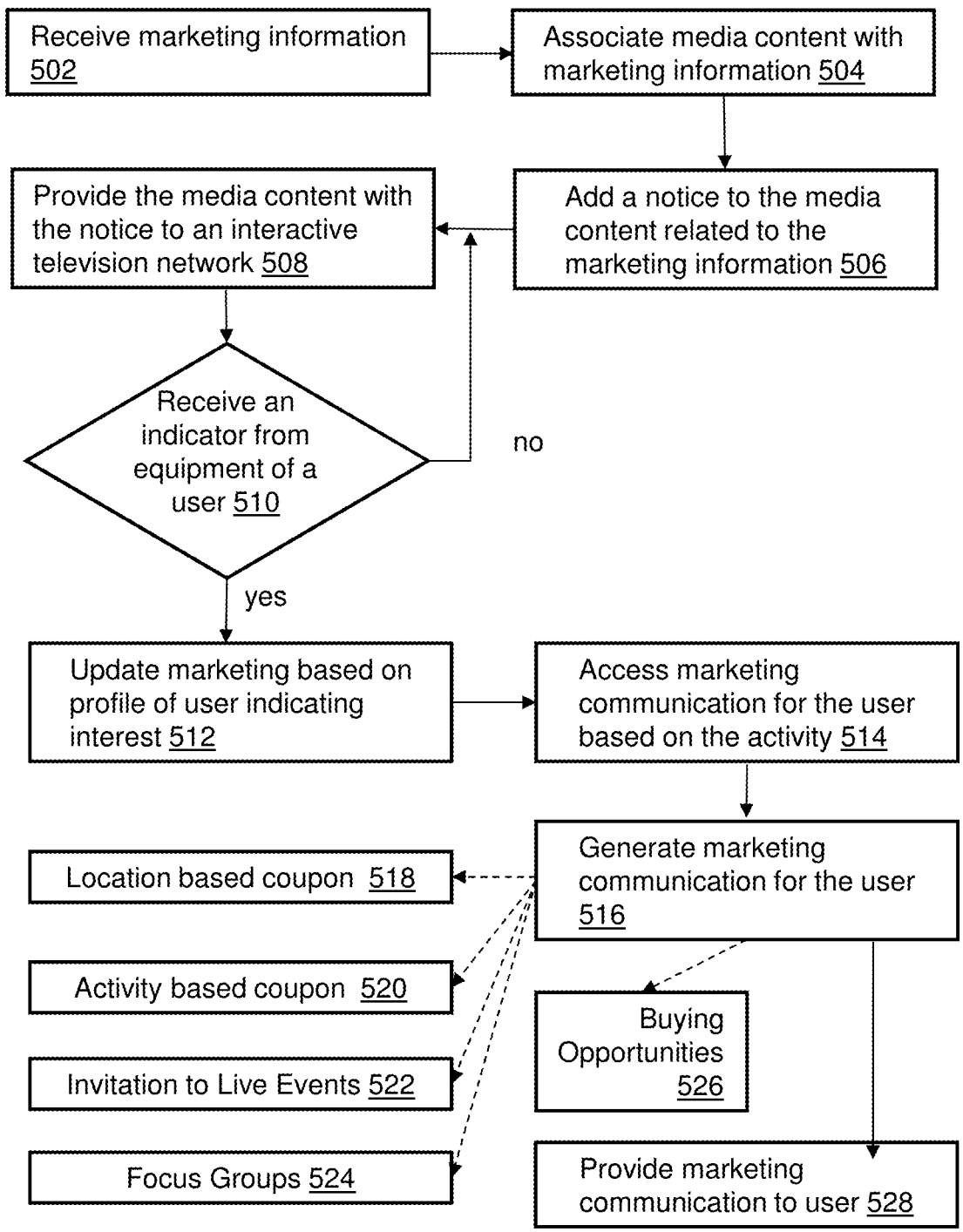
FIG. 5 depicts an illustrative embodiment of a method used in portions of the system described in FIGS. 1-3.

FIG. 5 depicts an illustrative embodiment of a method 500 used by systems 100, 200, and 300 to exemplarily prepare marketing information for the user in method 400. Exemplarily, marketing information is obtained in step 502. For example, an interactive television network may receive this marketing information from a sponsor or an advertiser, the marketing information may include a commercial to be placed in a broadcast or unicast television stream. The sponsor or advertiser can also include the marketing information that would be added to the commercial, such as directions for generating the overlay that would present the marketing information. For example, as illustrated in FIG. 2, the external source 202 would provide the television commercial to server 206 while providing the marketing information to the ad server 204.

With respect to FIG. 3, this marketing information could information pertaining to the overlay that would be provided to the media processor 306 to be displayed on the display device 302. Additionally, this information could include the various coupons, invitations, and sales events that would be provided to the consumer via, for example, the advertising application 102. The information could further include instructions for the ad server 204 on how to handle the interest information, such as forwarding the demographic information of a requesting viewer back to the external source 202 of FIG. 2.

Returning to FIG. 5, the media content would exemplarily be associated with the marketing information in step 504. Exemplarily, this association would take place based on a key provided with one of the marketing information and the media content, or both. Thus, in some embodiments, a media content stream would be constantly broadcast. The media stream would include advertising content, each commercial therein having a different key. The marketing information for each commercial would be matched up with the proper commercial. Exemplarily, this would provide the notice that should be added to the media content.

Next, in step 506, the notice would be provided with the media content. Thus, the commercial would be combined with the overlay where appropriate. In one embodiment, the media processor would receive these two information streams and combine them at the media processor. For example, based on the marketing information, the media processor would identify matching notifications and advertisements based on their keys and combine them before presenting the advertisement with the marketing. In yet another embodiment, the media processor could decide between different overlays for the advertisements based on the particular marketing strategy for the particular user of the media processor. Thus, for example, one user would receive an overlay that would stress one aspect of the product being advertised while another user would be presented with a different overlay. In other embodiments, the combination would take place upstream from the media processor, such as at an interactive television network server.

In this example, the overlay would be presented for many households that receive a broadcast from the interactive television network.

In step 508, the media content would be provided to the subscribers of an interactive television network. Thus, the media content would be broadcast, for example, and at certain points in the programming, or during the commercials, an overlay would be provided directing the user to express an interest in the current media content if interested in sales, coupons, or further information.

Step 510 would exemplarily monitor for an indicator of interest from the equipment of a user. Thus, for example, the user would press an "OK" button on the remote control during the presentation of the overlay. In some embodiments, the user may use the media processor's digital video recorder function to pause or play back the media content. Exemplarily, the input from the user would be received in step 510 regardless of whether the media content is being presented during a multicast, a unicast, an on-demand presentation, during a pause, or during a later viewing from the media processor's digital video recorder.

If step 510 does not receive an indicator of interest, method 500 would exemplarily return to providing media content with or without notices. On the other hand, if step 510 does determine that an indicator of interest was received, method 500 would proceed to step 512, while the media content stream continues to be delivered to the media processor, in which the user profile of the user expressing interest is accessed and then updated. Next, step 514 would exemplarily access the marketing communication from the marketing information. Next, in step 516, the marketing communication would exemplarily be generated for the user. For example, the demographic profile of the user would be accessed in order to select from a multiplicity of advertising options for the user.

Returning to FIG. 5, various forms of marketing communications can be chosen from. For example, location based coupons can be accessed in step 518. In other embodiments, an activity based coupon can be accessed in step 520. In yet other embodiments, the marketing communication can include invitations to live events for the advertiser in step 522. In other scenarios, the advertiser may determine that it would be helpful to extend an invitation to a focus group to the user in step 524. Other embodiments can include providing the user with focused or personalized buying opportunities in step 526. In some instances, these buying opportunities can include live, private shopping events. The various steps 518, 520, 522, 524, and 526 are illustrated with dashed-lines as they are optional communication outcomes for the marketing communication. Exemplarily, an optimal communication is determined for each user depending on a multiplicity of factors. Next, in step 528, the marketing communication is provided to the user, as similarly illustrated in step 420 of method 400 in FIG. 4.

While for purposes of simplicity of explanation, the respective processes are shown and described as a series of blocks in FIGS. 4 and 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 6:
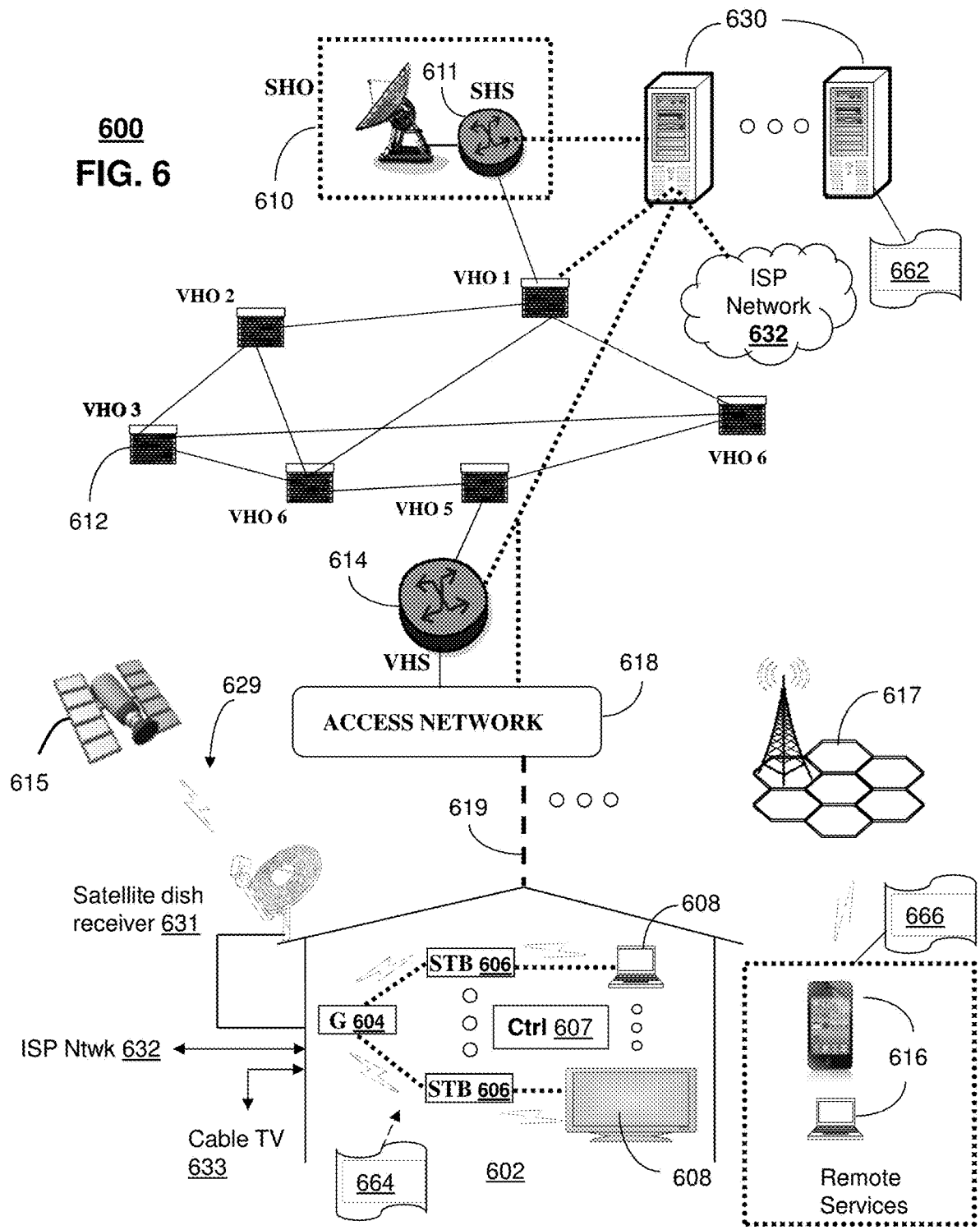
FIGS. 6-7 depict illustrative embodiments of communication systems that provide media services to the systems of FIGS. 1-3.

FIG. 6 depicts an illustrative embodiment of a first communication system 600 for delivering media content. The communication system 600 can represent an Internet Protocol Television (IPTV) media system. Communication system 600 can be overlaid or operably coupled with ad server 204 and server 206 of systems 200 and 300 of FIGS. 2 and 3 as another representative embodiment of communication system 600. For instance, one or more devices illustrated in the communication system 600 of FIG. 6 can perform operations of a media processor that performs operations that include receiving a stream of media content from an interactive television network, receiving offer details from an advertising server, wherein the offer details comprises a key, an offer, and marketing information, combining the offer with the stream of media content based on the key to generate a notification within a selected portion of the stream of media content as designated portions of the media content with the notification, presenting the stream of media content including the notification included within the designated portions of the media content, receiving a signal from equipment of a user that indicates an interest in one portion of the designated portions of the media content. Responsive to receiving the signal from the equipment of the user in the one portion of the media content, the operations include providing a notification that the signal was received in relation to the one portion of the media content to the advertising server associated, wherein the advertising server accesses account information of the user from the interactive television network, and that the advertising server retrieves marketing information for the one portion of the media content based on the account information of the user, wherein the marketing information includes location based information for the one portion of the media content, time based information for the one portion of the media content, and activity information for the one portion of the media content, and that the advertising server monitors mobile communication devices of the user regarding the one portion of the media content responsive to a determination that a location, a time, and an activity of the mobile communication devices satisfies the marketing information, that the advertising server determines a communication for the user based on the marketing information and the monitoring of the mobile communication devices to determine an optimal communication with the user, and that the advertising server delivers the communication to the mobile communication devices.

The IPTV media system can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee® or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. System 600 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as an ad server (herein referred to as ad server 630). The ad server 630 can use computing and communication technology to perform marketing activities, which can include among other things, the dispersal of marketing content as described in FIG. 7. For instance, function 662 of ad server 630 can be similar to the functions described for servers 204 and 206 of FIG. X in accordance with methods 400 and 500. The media processors 606 and wireless communication devices 616 can be provisioned with software functions 664 and 666, respectively, to utilize the services of ad server 630 and advertising application 102 of FIG. 1. For instance, functions 664 and 666 of media processors 606 and wireless communication devices 616 can be similar to the functions described for the system 100 provided with advertising application 102 of FIG. 1 and overlay presented on display device 302 of FIG. 3 in accordance with method 400.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
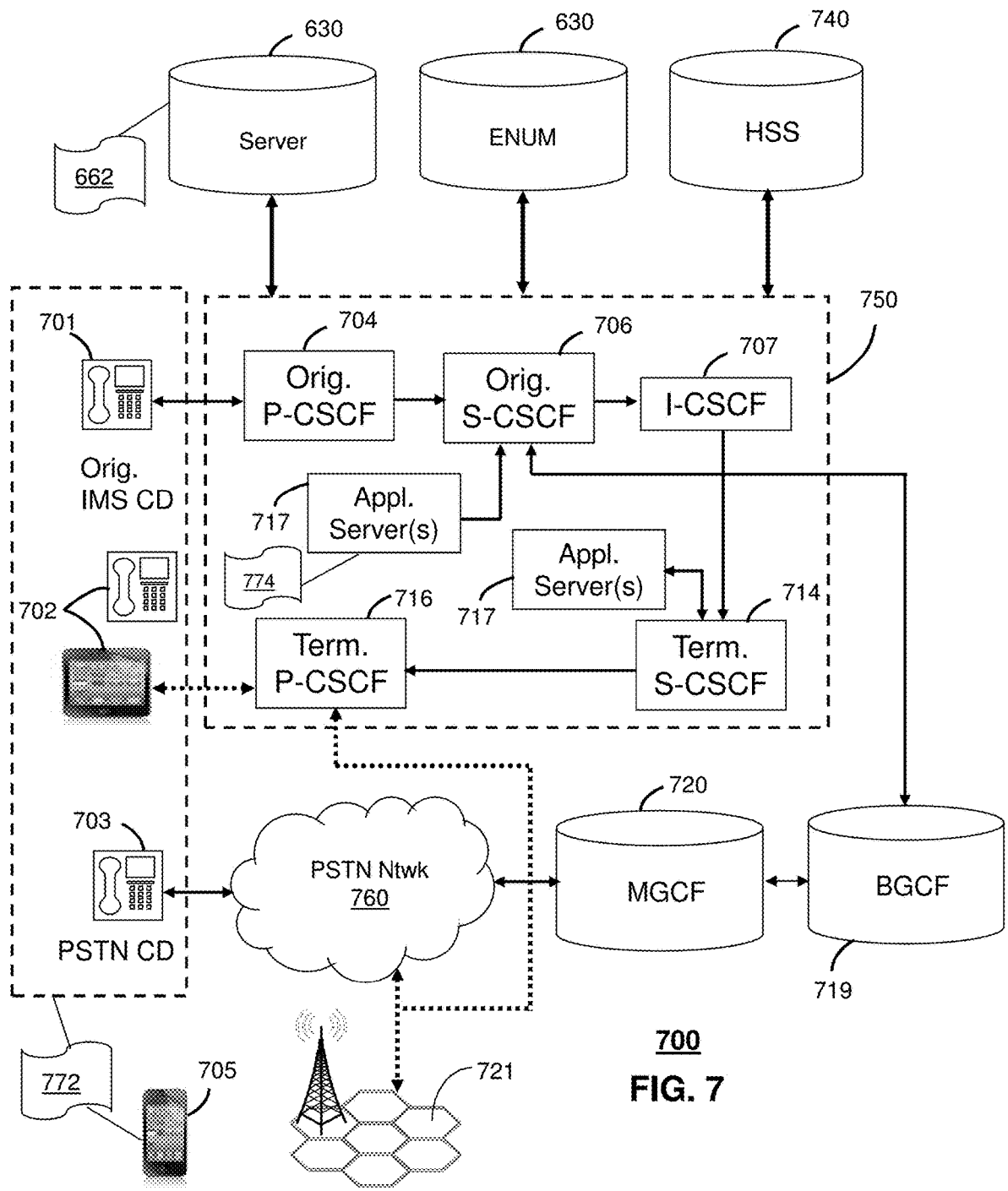

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with systems 100, 200, and 300 of FIGS. 1-3 and communication system 600 as another representative embodiment of communication system 600. Communication system 700 can include a machine-readable storage medium, including executable instructions that, when executed by a processing system including a processor, facilitate performance of operations that include receiving marketing information from an advertising server, wherein advertising server has accessed user information of a user responsive to receiving an indication of interest in a notification that was presented during a portion of media content presented to the user within a presentation of the media content at a media processor of the user, and wherein the advertising server obtained the marketing information for the user based on the indication of interest in the notification, monitoring activities of the user, such as accessing social media accounts, scheduling applications, messaging applications, and then providing the activities of the user to the advertising server, determining a location of interest for the user based on the marketing information, monitoring a location of the user to determine if the user is in proximity to the location of interest, and responsive to determining if the user is in proximity to the location of interest, the operations would include sending a message to the advertising server, the message including the location of the user, receiving, from the advertising server, directed marketing information for the location of the interest for the user, wherein the advertising server determines an optimal communication to the user based on the marketing information and the monitoring of the activity of the user, and presenting the directed marketing information to the user.

Communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The ad server 630 of FIG. 6 can be operably coupled to communication system 700 for purposes similar to those described above. Ad server 630 can perform function 662 and thereby provide marketing services to the CDs 701, 702, 703 and 705 of FIG. 7 similar to the functions described for servers 204 and 206 of FIG. 2 in accordance with method 500 of FIG. 5. CDs 701, 702, 703 and 705, which can be adapted with software to perform function 772 to utilize the services of the ad server 630 similar to the functions described for communication devices 310 of FIG. 3 enabled with advertising application 102 in accordance with method 400 of FIG. 4. Ad server 630 can be an integral part of the application server(s) 717 performing function 774, which can be substantially similar to function 664 and adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 8:
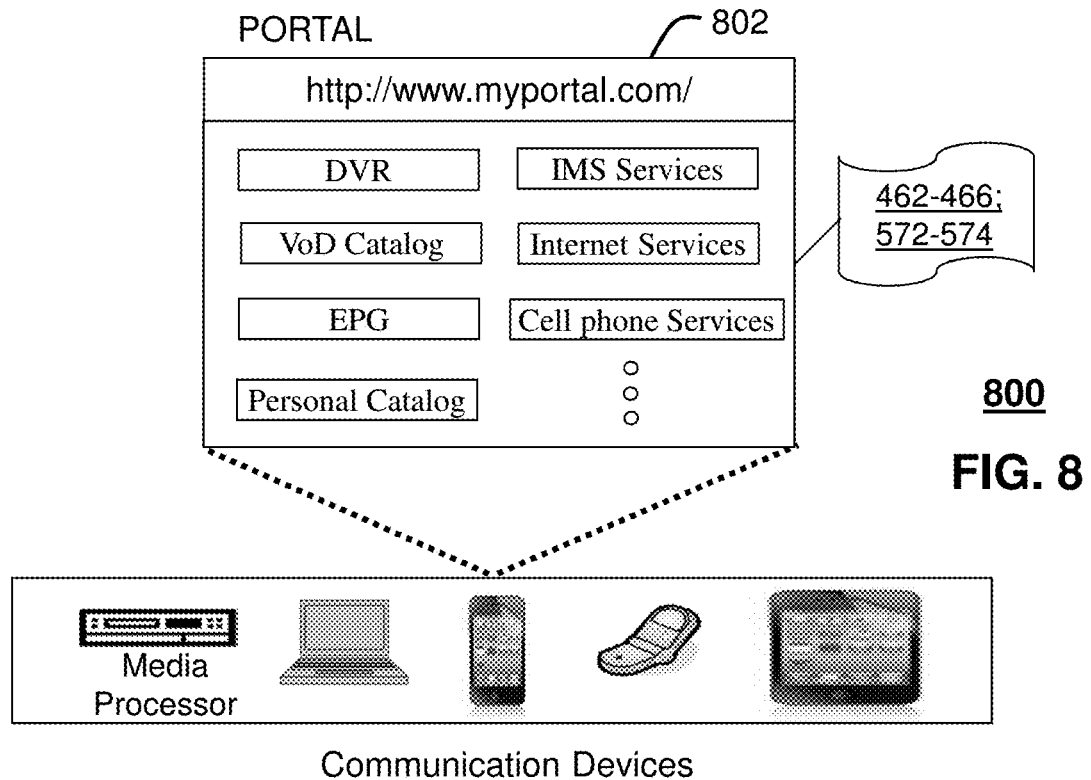
FIG. 8 depicts an illustrative embodiment of a web portal for interacting with the communication systems of to the systems of FIGS. 1-3 and 6-7.

FIG. 8 depicts an illustrative embodiment of a web portal 802 of a communication system 800. Communication system 800 can be overlaid or operably coupled with systems 100, 200, and 300 of FIGS. 1, 2, and 3, communication system 600, and/or communication system 700 as another representative embodiment of systems 100, 200, and 300 of FIGS. 1, 2, and 3, communication system 600, and/or communication system 700. The web portal 802 can be used for managing services of systems 100, 200, and 300 of FIGS. 1, 2, and Sand communication systems 600-700. A web page of the web portal 802 can be accessed by a Uniform Resource Locator (URL) with an Internet browser using an Internet-capable communication device such as those described in FIGS. 1, 2, and 3 and FIGS. 6-7. The web portal 802 can be configured, for example, to access a media processor 806 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 806. The web portal 802 can also be used for provisioning IMS services described earlier, provisioning Internet services, provisioning cellular phone services, and so on.

The web portal 802 can further be utilized to manage and provision software applications 665-665, and 774-775 to adapt these applications as may be desired by subscribers and/or service providers of systems 100, 200, and 300 of FIGS. 1, 2, and 3, and communication systems 600-700. For instance, users of the services provided by server 204 or server 630] can log into their on-line accounts and provision the servers 110 or server 630 with their account information so as to receive the various marketing communications generated in FIG. 5 and delivered as described in FIG. 4, and so on. Service providers can log onto an administrator account to provision, monitor and/or maintain the systems 100, 200, and 300 of FIGS. 1, 2, and 3 or server 630.

Figure 9:
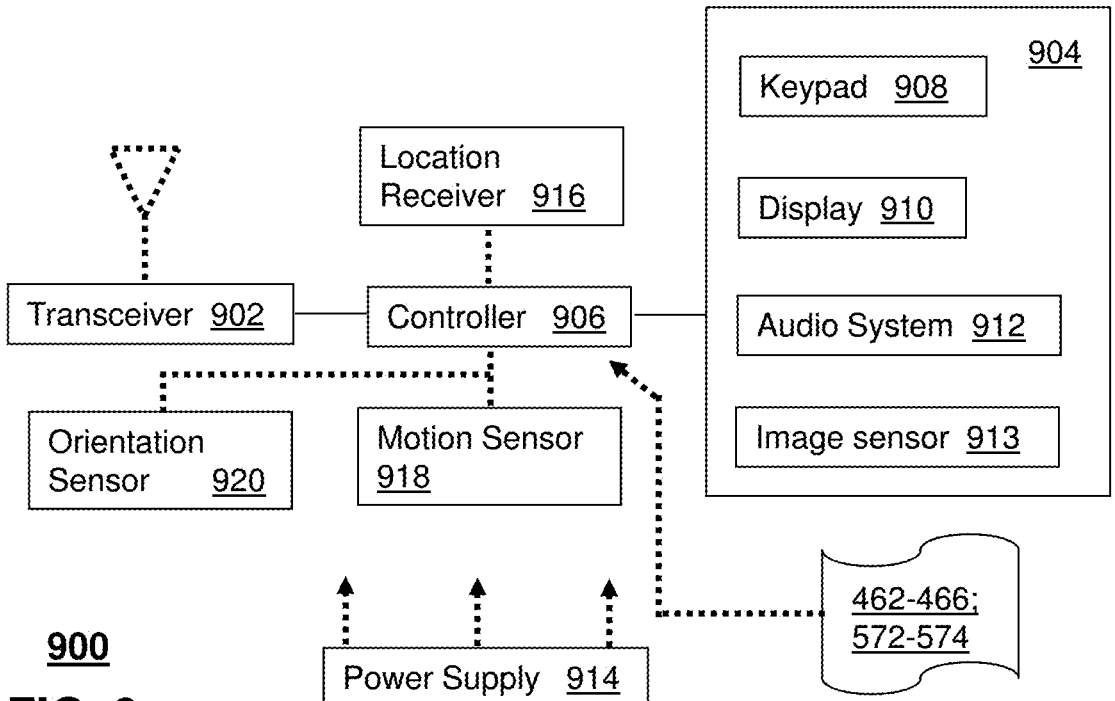
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1-3 and FIGS. 6-7 and can be configured to perform portions of method 400 of FIG. 4.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of systems 100, 200, and 300 of FIGS. 1, 2, and 3, the media processor 606, the media devices 608, or the portable communication devices 616 of FIG. 6, as well as the IMS CDs 701-702 and PSTN CDs 703-705 of FIG. 7. It will be appreciated that the communication device 900 can also represent other devices that can operate in systems 100, 200, and 300 of FIGS. 1, 2, and 3 and communication systems 400-700 of FIGS. 6-7 such as a gaming console and a media player. In addition, the controller 906 can be adapted in various embodiments to perform the functions 664-666 and 774-776, respectively.

Upon reviewing the aforementioned embodiments, it would be evident to an artisan with ordinary skill in the art that said embodiments can be modified, reduced, or enhanced without departing from the scope of the claims described below. For example, while most embodiments focused on traditional broadcast media content streams presented at a household media processor and display, other media content presentation options could also present the overlays and receive indicators of interest for the overlay, such as watching streaming movies or television shows on a mobile communications device, computing device, or tablet computing device. In addition, the generation of optimal communications for the user can involve contacting social media contacts of the user to create spontaneous gatherings at a location of interest, such as the donut shop or sporting event.

One or more of the exemplary embodiments can include determining a communication for the user by selecting a type of communication from among a group of types of communications that are compatible with operations of the mobile communication device. For instance, various factors can be utilized in the selection of the type of communication such as a format of content included in the communication, activity that the user is predicted to be engaged in during receiving of the communication, a history of successful marketing (e.g., completed purchases) that is linked to past communications and the particular types of communications that are more successful or less successful. One or more of the exemplary embodiments can be based on selecting communications, types of communications, recipient devices, and/or content for the communications according to a prediction of marketing success, such as whether or not it is more likely than not that the user will make a purchase when the communication is received. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
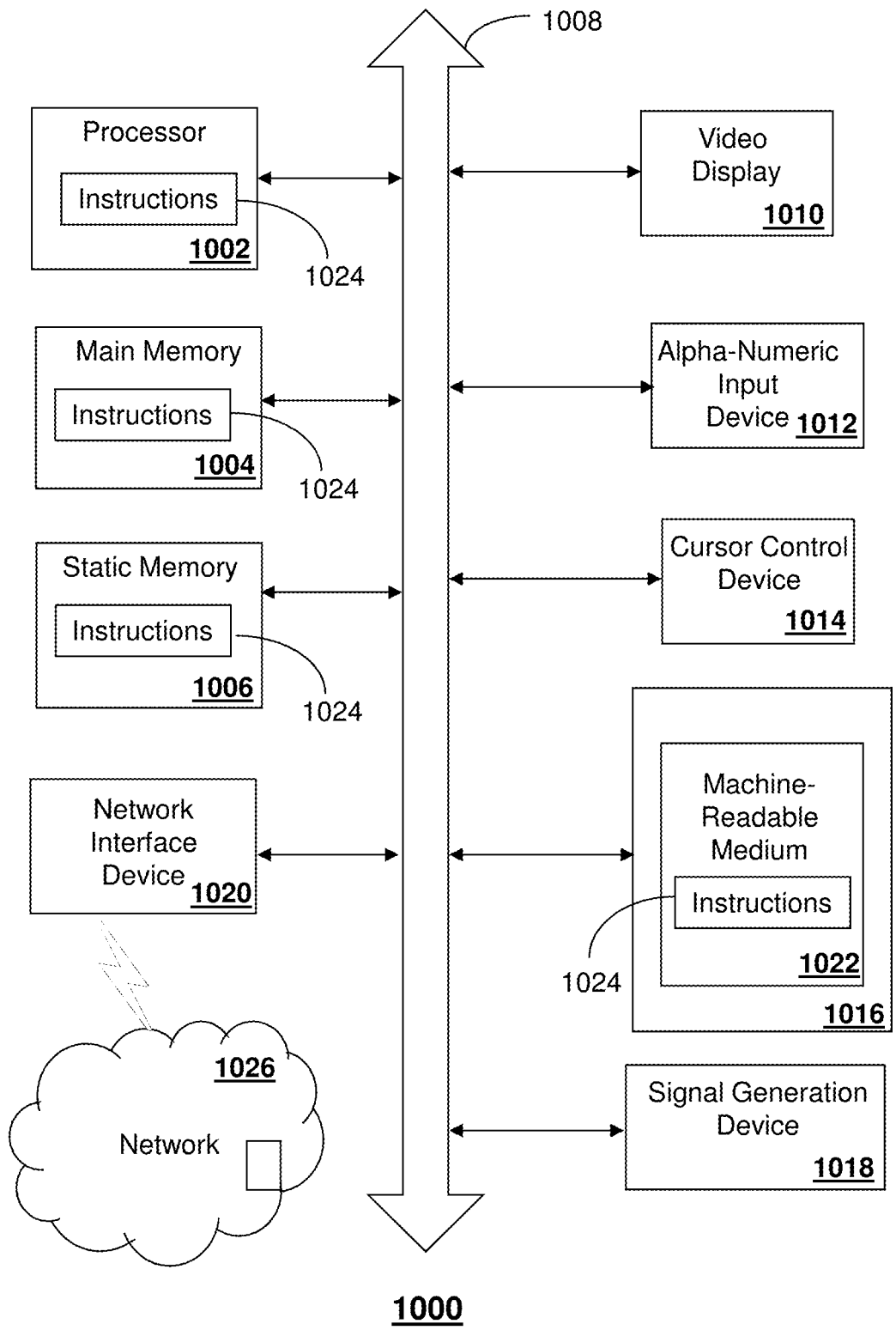
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the ad server 630, the media processor 606, the mobile communications device 310, the media processor 306 and other devices of FIGS. 1-9. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    receiving, by a processing system of a server that comprises a processor, a first stream that includes content, advertisements, and a first set of keys, wherein each first key corresponds to one of the advertisements, wherein the first stream is received from a content source equipment, wherein each respective first key uniquely identifies a respective advertisement of the advertisements, wherein the server is part of an interactive television system which provides a combined output of the content, the advertisements and offers:
    receiving, by the processing system, a second stream that includes the offers and a second set of keys, wherein each second key corresponds to one of the offers, wherein the second stream is received from an ad server, wherein each respective second key uniquely identifies a respective offer;
    combining, by the processing system, an a particular offer with a particular advertisement in a media content presentation to generate a notice within a portion of the media content presentation, wherein the combining is based on determining a match of a particular second key of the particular offer with a particular first key of the particular advertisement;
    providing, by the processing system, the notice in the portion of the media content presentation with the notice to be presented during the media content presentation at equipment of a user, wherein the offer is presented as an overlay on a screen of the equipment of the user, the overlay including an indication that there is additional content or information available regarding a product or service being advertised in the particular advertisement:
    providing, by the processing system, an audible prompt or a visual prompt instructing the user to indicate interest in the particular offer;
    receiving, by the processing system, an indication of interest in the particular offer of the portion of the media content from the equipment of the user during a presentation of the notice during the media content presentation at the equipment of the user, wherein the receiving the indication of interest comprises receiving the particular second key associated with the particular offer;
    identifying, by the processing system, the user responsive to receiving based on the particular second key associated with the particular offer, wherein the identifying the user is based on the respective key associated with the offer;
    obtaining, by the processing system, user information related to the particular offer of the portion of the media content responsive to the receiving of the particular second key and the indication of interest in the notice of the portion of the media content and based on the identifying the user;
    accessing, by the processing system, a user profile for the user based on the user information, wherein the accessing is based on the identifying of the user, wherein the user profile stores previously known information about the user based on a subscription service of the user;
    updating, by the processing system, the user profile with information about the indication of interest, wherein the updating is based on the identification of the user;
    retrieving, by the processing system, marketing information for the portion of the media content presentation based on the user profile, wherein the marketing information includes location based information for the portion of the media content presentation, time based information for the portion of the media content presentation, and activity information for the portion of the media content presentation;
    determining, by the processing system, mobile communication device information of the user based on the user profile, wherein the mobile communication device information includes location information, time information, and activity information of a mobile communication device of the user;
    monitoring, by the processing system, an activity of the mobile communication device of the user to determine when the mobile communication device information matches at least one of the location based information for the portion of the media content presentation, the time based information for the portion of the media content presentation, and the activity information for the portion of the media content presentation;
    determining, by the processing system, a communication for the user based on the marketing information and the monitoring of the activity of the mobile communication device, wherein the determining the communication for the user comprises selecting a type format of communication from among a group of types formats of communications that are compatible with operations of the mobile communication device; and providing, by the processing system, the communication for the user to the mobile communication device regarding the portion of the media content presentation responsive to the monitoring determining that the mobile communication device satisfies the marketing information.

2. The method of claim 1, wherein the receiving the indication of interest is based on user input at a remote control associated with the equipment of the user, and wherein the portion of the media content comprises an advertisement.

3. The method of claim 1, wherein updating the user profile of the user comprises updating, by the processing system, the user profile at one of an advertising server that provides the notice and an interactive television network server that provides the media content presentation with the indication of interest responsive to receiving the indication of interest.

4. The method of claim 1, wherein the marketing information further comprises invitations to focus groups concerning the portion of the media content.

5. The method of claim 1, further comprising:
receiving, by the processing system, the media content presentation from an interactive television network.

6. The method of claim 1, further comprising determining the activity information by obtaining scheduling information from an electronic calendar of the user via the mobile communication device,
wherein the determining the communication for the user further comprises consulting a history of the user profile, and
wherein the history of the user profile includes one of responses to previous communications, a user purchase history, and survey responses from the user.

7. The method of claim 1, further comprising accessing additional user computing devices based on the user profile to determine the activity information.

8. The method of claim 7, wherein the accessing the additional user computing device further comprises access a calendar scheduling application of the user executed by the additional user computing device.

9. The method of claim 1, wherein the location is determined by global positioning system of the mobile communication device.

10. The method of claim 1, wherein the marketing information further comprises invitations to events related to the portion of the media content.

11. A media processor, comprising:
a processing system including a processor; and
a memory that stores executable instructions that, when executed by the processing system, facilitate performance of operations, comprising:
receiving a first stream that includes media content, advertisements and a first set of keys, wherein each key corresponds to one of the advertisements, wherein the first stream is received from an interactive television network which provides a combined output of the content, the advertisements and offers, wherein each respective first key uniquely identifies a respective advertisement of the advertisements;
receiving a second stream that includes the offers and a second set of keys, wherein each second key corresponds to one of the offers, wherein the second stream is received from an advertising server, wherein the offers comprise marketing information, wherein the marketing information further comprises invitations to events related to a selected portion of the first stream of the media content;
combining a particular offer with a particular advertisement to generate a notification within the selected portion of the first stream of media content, wherein the combining is based on determining a match of a particular second key of the particular offer with a particular first key of the particular advertisement;
presenting the first stream of media content including the notification;
receiving a signal from equipment of a user that indicates an interest in the particular offer of one portion of the media content, wherein the receiving the signal comprises receiving the second key associated with the particular offer; and
responsive to receiving the signal from the equipment of the user in the one portion of the media content:
identifying the user using the second key associated with the particular offer,
providing a notification that the signal was received in relation to the one portion of the media content to the advertising server, wherein the advertising server accesses account information of the user from the interactive television network based on the identifying the user,
wherein the advertising server retrieves marketing information for the one portion of the media content based on the account information of the user, wherein the marketing information includes location based information for the one portion of the media content, time based information for the one portion of the media content, and activity information for the one portion of the media content,
wherein the advertising server updates the account information of the user responsive to receiving the second key associated with the offer and based on the identifying the user,
wherein the advertising server monitors communication devices of the user, based on the identifying of the user, regarding the one portion of the media content responsive to a determination that a location, a time, and an activity of the communication devices satisfies the marketing information,
wherein the communication devices of the user include a mobile communication device,
wherein the advertising server determines a communication for the user based on the marketing information and the monitoring of the communication devices, wherein the determining the communication for the user comprises selecting a type of communication from among a group of types of communications that are compatible with operations of the communication devices, and
wherein the advertising server delivers the communication to one of the communication devices.

12. The media processor of claim 11, wherein the presenting the first stream of media content including the notification comprises presenting an overlay containing the notification over the media content.

13. The media processor of claim 11, further comprising a digital video recorder, and wherein the operations further comprise:
storing the media content with the notification on the digital video recorder;
receiving a command to present the media content from the digital video recorder;

presenting the media responsive to receiving the command; and
receiving a signal from the equipment of the user that indicates an interest in the one portion of the media content when the notification is presented during the presenting the media content from the digital video recorder.

14. The media processor of claim 11, wherein the portion of the media content comprises a paid advertisement.

15. The media processor of claim 11, wherein the providing the notification that the signal was received to the advertising server further comprises providing user account information to the advertising server.

16. The media processor of claim 11, wherein the activity of the communication device is determined by obtaining scheduling information from an electronic calendar of the user.

17. A non-transitory, machine-readable storage medium, comprising executable instructions that, when executed by a processing system including a processor, facilitate performance of operations, comprising:
receiving marketing information from an advertising server, wherein the advertising server has accessed user information of a user based on identifying the user and responsive to receiving an indication of interest in a notification that was presented during a portion of media content presented to the user within a presentation of the media content at a media processor of the user, and wherein the advertising server obtained the marketing information for the user based on the indication of interest in the notification and the identifying the user, wherein a first stream including the media content, advertisements and a first set of keys was presented to the media processor of the user, each respective first key uniquely identifying a respective advertisement of the advertisements, and wherein the notification was uniquely associated with a second key presented in a second stream, the second stream including offers and a second set of keys including the second key, each second key corresponding to one of the offers, and the notification was generated based on a match between a particular first key and a particular second key, and wherein the advertising server received the second key as part of the indication of interest, the second key identifying the notification and identifying the user to provide identification of the user;
providing information identifying the user to the advertising server to update the user information of the user;
monitoring activities of the user, wherein the activities comprise accessing one of social media accounts, scheduling applications, messaging applications, and location determining software, and wherein the marketing information defines scheduled activities of the scheduling application that are associated with the indication of interest;
providing the activities of the user to the advertising server;
determining a location of interest for the user based on the marketing information;
monitoring a location of the user to determine if the user is in proximity to the location of interest; and
responsive to determining that the user is in proximity to the location of interest:
sending a message to the advertising server, the message including the location of the user;
receiving, from the advertising server, directed marketing information for the location of the interest for the user, wherein the advertising server determines a target communication to the user based on the marketing information and the monitoring of the activity of the user, the target communication being based on a prediction of marketing success, wherein the determining the communication for the user comprises selecting a type of communication from among a group of types of communications that are compatible with operations of the processing system; and
presenting the directed marketing information to the user.

18. The non-transitory, machine-readable storage medium of claim 17, wherein the operations further comprise:
determining an activity of interest for the user based on the marketing information;
monitoring an activity of the user to determine if the user is engaged or about to be engaged in the activity of interest; and
responsive to determining if the user is engaged in or about to be engaged in the activity of interest:
sending a message to the advertising server, the message including the location of the user and an alert regarding the activity of interest;
receiving, from the advertising server, directed marketing information for the activity for the user; and
presenting the directed marketing information to the user.

19. The non-transitory, machine-readable storage medium of claim 17, wherein the operations further comprise:
accessing a scheduling application of the user;
determining, from the scheduling application, an activity of interest for the user based on the marketing information;
monitoring a schedule of the user from the scheduling application to determine if the user is about to be engaged in the activity of interest; and
responsive to determining if the user is in is about to be engaged in the activity of interest:
sending a message to the advertising server, the message including the location of the user and an alert regarding the schedule;
receiving, from the advertising server, directed marketing information for the activity for the user; and
presenting the directed marketing information to the user.

20. The non-transitory, machine-readable storage medium of claim 17, wherein the operations further comprise presenting a graphical user interface to present the marketing information to the user, wherein the marketing information comprises one of a companies associated with the marketing information, respective locations of one of the companies, and communications from one of the companies, wherein the communications comprise one of a coupon for use at the location of interest, an advertisement, an invitation to a focus group, an invitation to a private event, and an invitation to participate in a focus group, and wherein the directed marketing includes a map of alternative locations to use the coupon.

\* \* \* \* \*